(12) United States Patent
Faahs

(10) Patent No.: US 6,802,343 B2
(45) Date of Patent: Oct. 12, 2004

(54) VEHICLE SEWER LINE ASSEMBLY AND METHOD OF USING SAME

(75) Inventor: Gary R. Faahs, P.O. Box 600282, San Diego, CA (US) 92160

(73) Assignee: Gary R. Faahs, San Diego, CA (US)

( * ) Notice: Subject to any disclaimer, the term of this patent is extended or adjusted under 35 U.S.C. 154(b) by 35 days.

(21) Appl. No.: 10/317,889

(22) Filed: Dec. 11, 2002

(65) Prior Publication Data

US 2004/0112448 A1 Jun. 17, 2004

(51) Int. Cl.[7] .............................................. A01G 25/09
(52) U.S. Cl. ..................... 137/899; 137/355.16; 248/75
(58) Field of Search ........................... 137/355.16, 899; 248/75

(56) References Cited

U.S. PATENT DOCUMENTS

| | | | | |
|---|---|---|---|---|
| 3,712,331 A | * | 1/1973 | Otto ....................... | 137/355.16 |
| 3,730,228 A | * | 5/1973 | Gibbs, Sr. .................. | 138/106 |
| 4,102,523 A | * | 7/1978 | Finnell ....................... | 248/49 |
| 4,125,237 A | * | 11/1978 | Hagins ........................ | 248/49 |
| 4,228,978 A | * | 10/1980 | Rand ........................... | 248/49 |
| 5,067,679 A | * | 11/1991 | Courtney ..................... | 248/75 |
| 6,378,555 B2 | * | 4/2002 | Kyle ........................ | 137/613 |

* cited by examiner

*Primary Examiner*—A. Michael Chambers
(74) *Attorney, Agent, or Firm*—Duckor Spradling Metzger & Wynne; Bernard L. Kleinke

(57) ABSTRACT

In accordance with a disclosed embodiment of the present invention, a sewer line assembly for a vehicle, such as a recreational vehicle or the like, having a sewer line outlet, includes a housing mounted on the vehicle, and a sewer discharge line mounted in axial alignment with the housing in-fluid communication with the vehicle sewer outlet. The sewer line contracts axially to a short storage configuration to be supported at least partially within the housing. The line expands axially to a long sewage-conveying use configuration. A discharge nozzle connected in fluid communication with the discharge end of the sewer line couples to a remotely located sewer inlet.

16 Claims, 2 Drawing Sheets

VEHICLE SEWER LINE ASSEMBLY AND METHOD OF USING SAME

BACKGROUND OF THE INVENTION

1. Field of the Invention

The present invention relates in general to a vehicle sewer line assembly and method of using it. The invention more particularly relates to a method and assembly for discharging sewage from a vehicle such as a recreational vehicle, to a remotely located sewer inlet.

2. Background Art

There is no admission that the background art mentioned in this section is legally constituted as prior art.

Vehicles such as recreational vehicles having sewer discharge outlets, often times park in camp grounds or the like, and a flexible sewer line is connected between the sewer line outlet and the inlet of a remotely located sewer. In this manner, vehicle can be used while parked and discharge sewage in convenient manner.

There have been a variety of devices used for coupling the flexible sewer line to the vehicle sewer outlet. For example, reference may be made to the following United States patents:

| U.S. PAT. NO. | INVENTOR | ISSUE DATE |
| --- | --- | --- |
| 4,054,159 | Nelson | Oct. 18, 1977 |
| 4,228,978 | Rand | Oct. 21, 1980 |
| 4,554,949 | Sell | Nov. 26, 1985 |
| 4,587,994 | Links et al. | May 13, 1986 |
| 4,660,860 | Todd | Apr. 28, 1987 |
| 4,688,833 | Todd | Aug. 28, 1987 |
| 4,708,370 | Todd | Nov. 24, 1987 |
| 4,722,556 | Todd | Feb. 2, 1988 |
| 4,796,926 | Rapsilver | Jan. 10, 1989 |
| 4,844,121 | Duke | Jul. 4, 1989 |
| 4,941,629 | Horn | Jul. 17, 1990 |
| 5,417,460 | Lunder | May 23, 1995 |
| 5,431,455 | Seely | Jul. 11, 1995 |
| 5,667,256 | Caine | Sep. 16, 1997 |
| 5,704,659 | Lunder | Jan. 6, 1998 |
| 5,709,414 | Bailey et al. | Jan. 20, 1998 |
| 6,240,986 B1 | Berkes et al. | Jun. 5, 2001 |
| 6,378,555 B2 | Kyle | Apr. 30, 2002 |
| DAVITS | | |
| 3,942,655 | Andersen | Mar. 9, 1976 |
| 3,961,713 | Stine | Jun. 8, 1976 |
| 4,139,110 | Roberts | Feb. 13, 1979 |
| 4,145,782 | De Sepio et al. | Mar. 27, 1979 |
| 4,436,180 | Nilsson | Mar. 13, 1984 |
| 4,449,315 | Puretic | May 22, 1984 |
| 4,499,844 | Parish | Feb. 19, 1985 |
| 4,516,123 | Van den Haak | Jul. 2, 1985 |
| 4,672,898 | Davidson | Jun. 16, 1987 |
| 4,699,075 | Tortorici | Oct. 13, 1987 |
| 4,850,298 | McGlew | Jul. 25, 1989 |
| 4,913,076 | Norton | Apr. 3, 1990 |
| 5,020,463 | Franklin et al. | Jun. 4, 1991 |
| 5,238,025 | Preston | Aug. 24, 1993 |
| 5,498,011 | Kilada et al. | Mar. 12, 1996 |
| 5,951,227 | Calkins et al. | Sep. 14, 1999 |
| 5,996,524 | Johnson | Dec. 7, 1999 |
| 6,027,103 | Painter | Feb. 22, 2000 |
| 6,082,493 | Mason | Jul. 4, 2000 |
| 6,357,380 B2 | Halcomb et al. | Mar. 19, 2002 |
| 6,371,694 B1 | De Varax et al. | Apr. 16, 2002 |

While such couplers facilitate the connection and disconnection from the sewer outlet, the sewer line must first be cleaned by discharging a cleaning liquid through the flexible sewer line before disconnecting it from the sewer outlet. Once the sewer line is thus cleaned and removed from the vehicle, it frequently contains a substantial amount of the cleaning fluid residue therein. This liquid then can leak from the removed sewer line, and thus can soil a person's clothes or other clean objects inadvertently. Also, storage of the flexible sewer line on the recreational vehicle can be unwieldy and somewhat time consuming to stow the line after it is used.

Thus, it would be highly desirable to have a new and improved method and apparatus for removal of sewage from a vehicle in a convenient manner.

BRIEF DESCRIPTION OF THE DRAWINGS

The following is a brief description of the drawings.

DESCRIPTION OF CERTAIN EMBODIMENTS OF THE INVENTION

Figure 1:
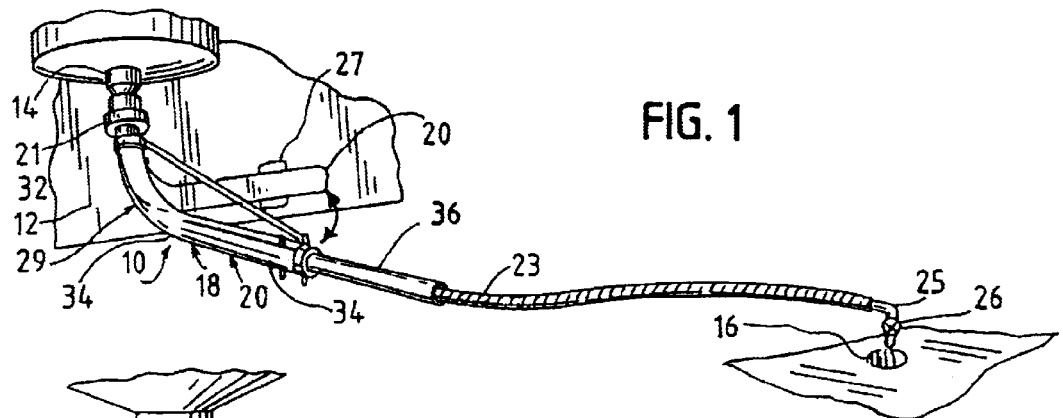
FIG. 1 is a pictorial view of a vehicle sewer line assembly, which is constructed in accordance with an embodiment of the present invention, and which is shown mounted on a vehicle.

In accordance with a disclosed embodiment of the present invention, a sewer line assembly for a vehicle, such as a recreational vehicle or the like, having a sewer line outlet, includes a housing mounted on the vehicle, and a sewer discharge line mounted in axial alignment with the housing in-fluid communication with the vehicle sewer outlet. The sewer line contracts axially to a short storage configuration to be supported at least partially within the housing. The line expands axially to a long sewage-conveying use configuration. A discharge nozzle connected in fluid communication with the discharge end of the sewer line couples to a remotely located sewer inlet.

In accordance with another disclosed embodiment of the invention, a davit mechanism helps support the housing and the line from the vehicle. As to another embodiment of the invention disclosed herein, a valve inhibits the contents of the line from leaking therefrom while in the storage configuration. Other disclosed embodiments relate to the housing having tubular members telescoping relative to one another, and a swivel coupler to mount the housing to the vehicle.

According to certain embodiments of the invention, there is provided a method and apparatus of conveying sewage from a vehicle such as a recreational vehicle, or the like, by mounting a tubular housing on the vehicle with an axially expandable sewer discharge line mounted therein in fluid communication with the vehicle sewer outlet. According to the disclosed embodiments, the sewer line is contracted axially to be supported at least partially within the housing, and expanding axially to a sewage-conveying use configuration so that the discharge end of the line can be connected in communication with a sewer inlet.

According to other disclosed embodiments of the invention, there is provided a sewer line assembly including a davit which includes a generally L-shaped housing for mounting substantially flat against a vehicle such as a recreational vehicle or the like, and a swivel coupler attached to one end portion of the housing to the vehicle for permitting the housing to rotate about an upright axis outwardly away from the vehicle to cause an outer end portion of the housing to extend outwardly away from the vehicle in a use position. An expandable sewer line is mounted at least partially within the housing in fluid communication with the vehicle sewer outlet for extending from the outer end portion of the housing to a remotely located sewer inlet.

According to another embodiment of the invention, a method of cleaning a sewer line assembly includes using an expandable sewer line connected at one of its ends in fluid communication with a vehicle sewer outlet and having a gate valve mounted at the other discharge end of the sewer line, wherein the gate valve is closed and the sewer line is substantially filled with cleaning solution so that the gate valve can thereafter be opened to flush the interior of the line for a thorough cleaning purposes.

Figure 2:
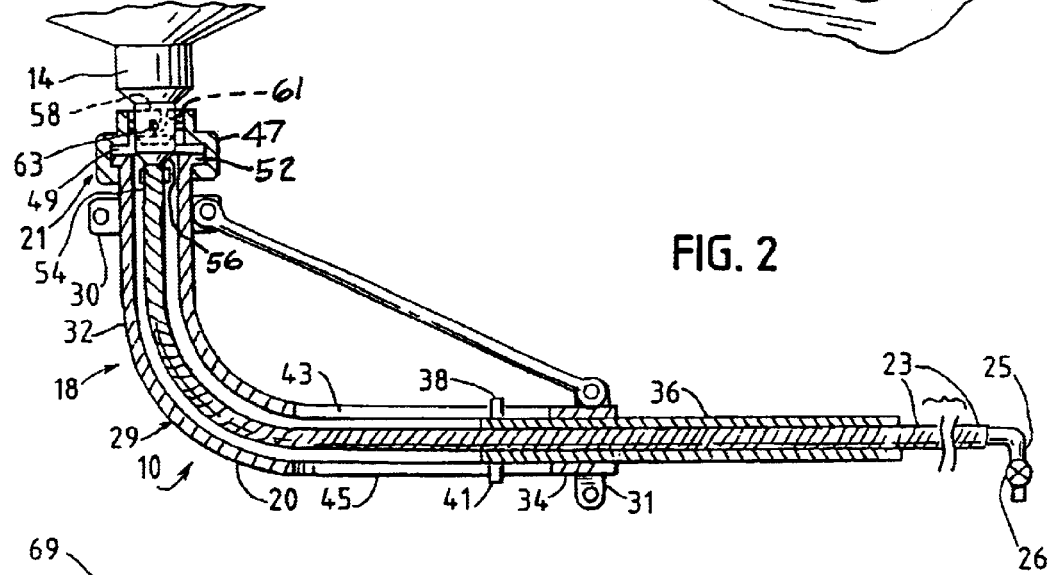
FIG. 2 is an enlarged sectional view of the assembly of FIG. 1.

Referring now to the drawings, and more particularly to FIGS. 1 and 2 thereof, there is shown a vehicle sewer line assembly 10, which is adapted to be mounted on a vehicle 10 in the form of a recreational vehicle, trailer, or other vehicle having a sewer outlet such as the sewer outlet 14. The vehicle sewer line assembly 10 is constructed in accordance with the disclosed embodiment of the invention, and which is adapted to convey sewage from the vehicle 10 via its sewer outlet 14 to a remotely located sewer inlet 16 in a convenient manner.

The assembly 10 generally comprises a davit mechanism generally indicated at 18, which includes an L-shaped tubular housing 20 mounted in fluid communication with the vehicle sewer outlet 14 via a swivel coupler 21 which enables the L-shaped tubular housing 20 to be stored in a storage position as indicated in broken lines in FIG. 1 flat against the vehicle 12 and then can be rotated about an upright axis to a position substantially transverse, and projecting outwardly from, the vehicle 12 as indicated in solid lines in FIG. 1. A rigid strut 22 forms a part of the davit mechanism 18 to help strengthen the L-shaped tubular housing 20. An expandable sewer line 23 is connected in fluid communication at its upper end to the vehicle sewer outlet 14 and has an L-shaped discharge nozzle 25 at its opposite end for engaging the sewer outlet 14. A gate valve 26 is mounted at the nozzle 26 to facilitate the cleaning of the sewer line 23 in accordance with an embodiment of the invention and is useful in the storage of the assembly when stowed flat against the vehicle 12 by means of a housing clamp or housing retainer 27 (FIG. 1) so that inadvertent leakage from the assembly is prevented, or at least greatly inhibited. Thus, the sewer line 23 remains connected in fluid communication with the sewer outlet 14, at all times, even during storage.

Considering now the housing 20 in greater detail, the housing 20 generally includes an L-shaped outer tubular member 29 which has the strut 22 connected between a collar 30 at the upper end thereof below the swivel coupler 21, and a collar 31 at the outer end of the tubular member 29. The L-shaped member 29 includes a vertical portion 32 connected at its upper end to the swivel coupler 21, and a horizontal portion 34 which can be adjustably extended. In this regard, the horizontal portion 34 includes an inner rectilinear tubular member 36 which extends telescopically within the horizontal portion 34 to enable the overall length of the horizontal portion of the L-shaped member 29 to be adjusted in its axial length. A pair of radial pins 38 and 41 extend from the inner tubular member 36 and are disposed within respective elongated slots 43 and 45 in the horizontal tubular portion 34 of the L-shaped outer tubular member 29 to facilitate the inner tubular member 36 to move adjustably inwardly or outwardly with respect to the horizontal portion 34.

Considering now the swivel coupler in greater detail with reference to FIG. 2, the coupler 21 generally includes a housing 47 having an internal annular groove 49 for receiving an annular flange 52 on the upper end of the vertical portion 32 of the L-shaped tubular member 29 for permitting it to rotate freely about its substantially vertical or upright axis. A hose clamp 54 secures the upper end of the sewer line 23 to an outer coupler 56, which is connected in fluid communication with an inner coupler 58. The inner coupler 58 includes a pair of bayonet slots such as the slot 61 for receiving pins such as the pin 63 on the distal end portion of the sewer outlet 14.

Considering now the method of operation of the sewer line assembly 10 in accordance with the disclosed embodiments of the invention, the L-shaped tubular housing 20 is disengaged from the housing retainer 27 to swing the horizontal portion 34 outwardly away from the vehicle 14 to direct the horizontal portion 34 of the L-shaped outer tubular member 29 toward the sewer inlet 16. The expandable sewer line 23 is then extended outwardly from the L-shaped housing 20 until the nozzle 25 engages the sewer inlet 16. The inner tubular member 36 is slid extensively outwardly from the horizontal portion 34 of the L-shaped outer tubular member 29 into the position as indicated in FIGS. 1 and 2 of the drawings. By so doing, the L-shaped tubular housing 20 including the extended inner tubular member 36 helps protect the sewer line 23 when it is in its use position as indicated in FIG. 1 against inadvertently jarring or bumping the line 23.

Prior to returning the assembly 10 to its storage position, the sewer line 23 is cleaned in accordance with an embodiment of the invention. The gate valve 26 is closed, and a valve (not shown) for the vehicle 12 is opened to permit flushing liquid to enter the sewer line 23 and to substantially fill it. Thereafter, the vehicle valve (not shown) is closed and then the gate valve 26 is opened to drain the flushing liquid therefrom into the inlet 16. In so doing, the interior of the line 23 is substantially entirely filled with the cleaning fluid prior to flushing it from the line 23 so that the contents thereof is substantially completely flushed and cleaned prior to storage of the unit. Thereafter, the valve 26 is closed, and the sewer line 23 is retracted into the L-shaped tubular housing 20, and the inner tubular member 36 is retracted into the horizontal portion 34 of the L-shaped outer tubular member 29. The horizontal portion 34 is then manually moved into substantially flat engagement with the vehicle 12 and is retained releasably in place by the housing retainer 27 as shown in broken lines in FIG. 1.

Figure 3:
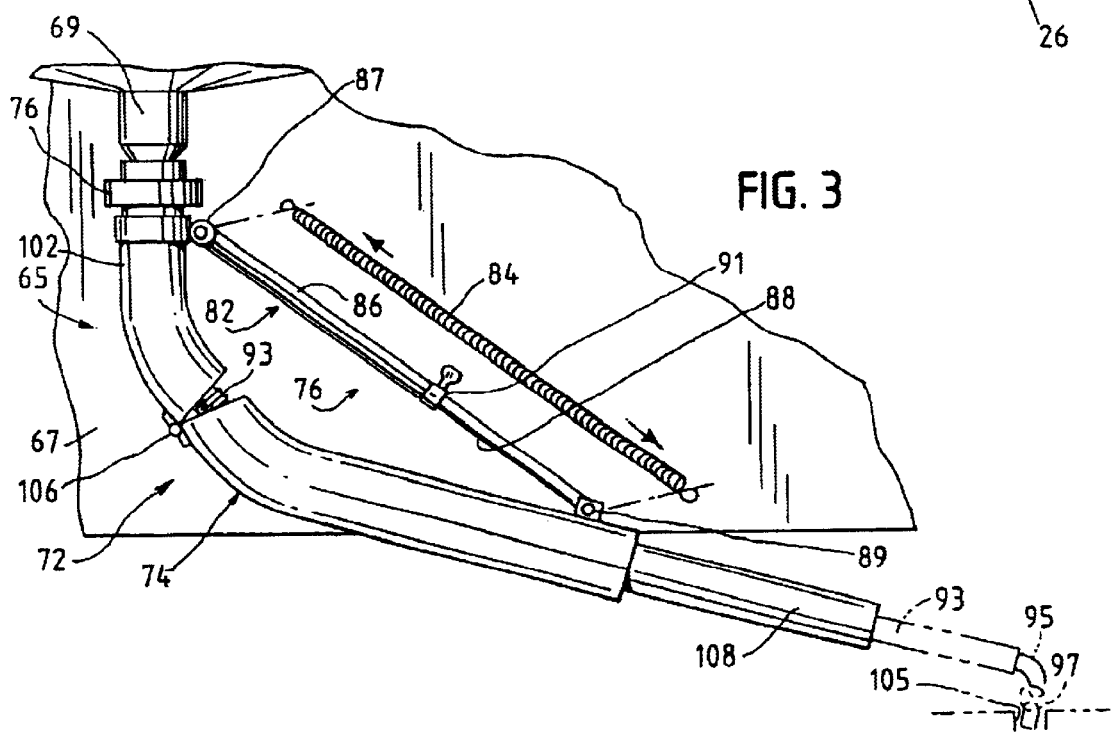
FIG. 3 is an elevational view of another vehicle sewer line assembly, which is constructed in accordance with another embodiment of the present invention, and which is illustrated in its sue position.
Figure 4:
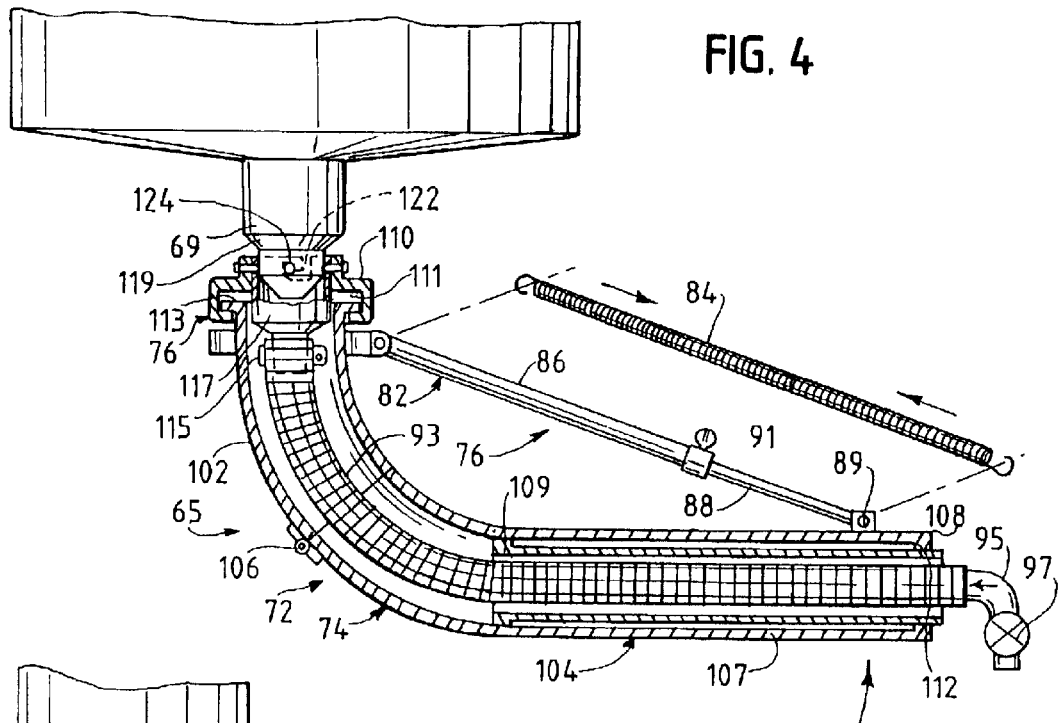
FIG. 4 is an enlarged sectional view of the assembly of FIG. 3, illustrating it in its storage position.

Referring now to the FIGS. 3 and 4 of the drawings, there is shown is a vehicle sewer line assembly 65, which is mounted to a vehicle 67 such as a recreational vehicle, trailer or the like having a sewer outlet 69. The assembly 65 is constructed in accordance with an embodiment of the invention and includes a davit mechanism 72 which includes an L-shaped tubular housing 74 connected at its upper end to the sewer outlet 69 via a swivel coupler 76 which is generally similar to the swivel coupler 21 of FIGS. 1 and 2.

The davit mechanism 72 includes a strut assembly 78 which includes a longitudinally extending adjustable rigid member 82 and a coil spring 84. The longitudinally adjustable rigid member 82 includes an outer telescoping member 86 which is pivotally attached at 87 to the upper end of the housing 74, and receives an inner telescoping member 88 which is pivotally attached at 89 to the outer end portion of the L-shaped tubular housing 74. A manually adjustable clamp 91 secures the inner and outer telescoping members in an adjusted longitudinal position.

An expandable sewer line 93 is connected at its upper end in fluid communication with the sewer outlet 69 in a manner similar to the sewer line 23 of FIGS. 1 and 2. An L-shaped discharge nozzle 95 is disposed at the outer end of the sewer line 93 and has a gate valve 97 in a similar manner as the nozzle 25 and the gate valve 26 of FIGS. 1 and 2 to function in a similar manner.

Considering now the L-shaped tubular housing 74 in greater detail, the housing 74 generally includes a vertical portion 102 which is connected to the swivel coupler 76, and a horizontal portion 104 which is hingedly connected to the bottom end portion of the vertical portion 102 at 106 to enable the L-shaped tubular housing 74 to swing between its storage position and its use position in a similar manner as the assembly 10 of FIGS. 1 and 2, but also to enable the horizontal portion 104 to be adjusted in a downwardly extending angular position from the horizontal as indicated in FIG. 3 to help extend the horizontal portion 104 toward a sewer outlet 105. In so doing, the clamp 91 is loosened to permit the strut 76 to be adjusted longitudinally to lengthen it in the use position (FIG. 3), and to shorten it in the storage position (FIG. 4). The spring 84 urges the strut 76 to contract to the storage position and thus to facilitate the L-shaped housing 74 to return to its storage position. It will become apparent to those skilled in the art that the spring 84 may be used by itself in place of the telescoping members 86 and 88.

Considering now the horizontal portion 104 of the L-shaped tubular housing 74 in greater detail, the portion 104 includes an outer horizontal tubular member 107 which has an inner horizontal tubular member 108 telescopically mounted there within to serve a similar function as the inner tubular member 36 of the assembly 10 of FIGS. 1 and 2. As shown in FIG. 4, a rear annular flange 109 on the inner horizontal tubular member 108 is adapted to engage an internal annular shoulder or stop 112 of the outer horizontal tubular member 107 to limit the outward movement of the inner horizontal tubular member 108.

Considering now the swivel coupler 76 in greater detail, the coupler 76 includes a housing 110 having an internal annular groove 111 for receiving an internal annular flange 113 of the vertical portion 102 of the L-shaped housing 74 to permit it to swivel in a similar manner as the swivel coupler 21 of FIGS. 1 and 2. A hose clamp 115 secures the upper end of the expandable sewer line 93 fixedly to an outer coupler 117, which in turn is connected in fluid communication with an inner coupler 119. The inner coupler 119 includes a pair of bayonet slots such as the slot 122, for receiving a pair of pins such as pin 124 extending radially outwardly from the sewer outlet 69.

Figure 5:
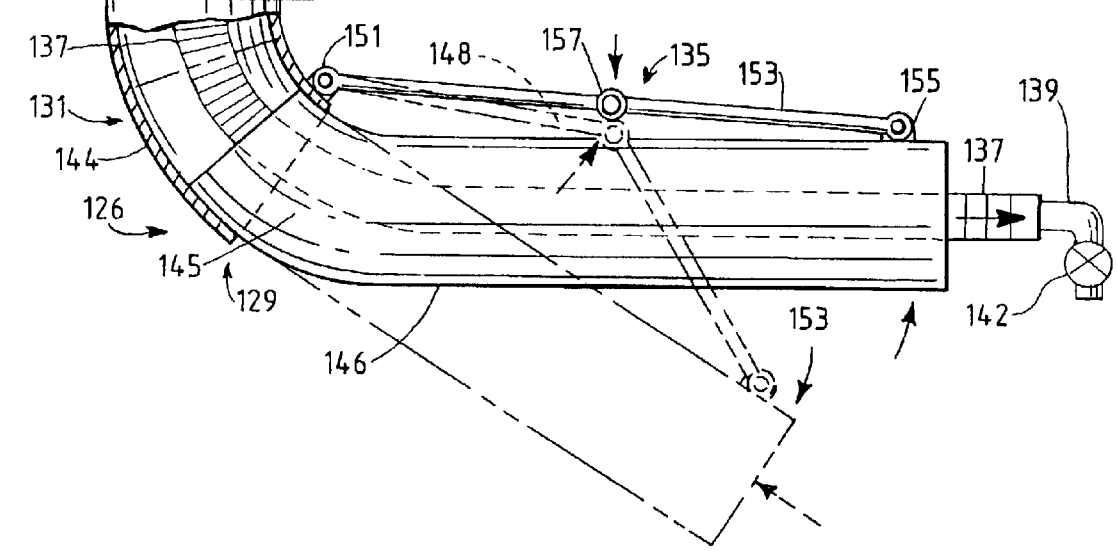
FIG. 5 is an elevational view of yet another vehicle sewer line assembly, which is constructed in accordance with yet another embodiment of the present invention.

Referring now to FIG. 5, there is shown a vehicle sewer line assembly 126 which is connected in fluid communication with a vehicle sewer outlet 128 of a vehicle (not shown). The assembly 126 is constructed in accordance with another embodiment of the invention and includes a davit mechanism 129 which is similar to the davit mechanism 72 of FIGS. 3 and 4 in that it permits the unit to swivel outwardly from the vehicle and then moved adjustably downwardly away from the horizontal. The davit mechanism 129 includes an L-shaped tubular housing 131 connected at its upper end to a swivel coupler 133, which is similar to the swivel coupler 76 of FIGS. 3 and 4. The davit mechanism 129 includes an articulated strut 135 which helps rigidify the L-shaped housing 131. An expandable sewer line 137 is connected at its upper end in fluid communication with the sewer outlet 128 in a similar manner as the sewer line 93 is connected to its sewer outlet 69 of FIG. 4. At the opposite end of the expandable sewer line 137 there is disposed an L-shaped discharge nozzle 139 and a gate valve 142 which function in a similar manner as the nozzle 195 and the gate valve 97 of FIG. 4.

Considering now the housing 131 in greater detail, the housing 131 includes a generally vertical L-shaped outer tubular member 144 which is curved about its central axis and receives telescopically a curved end portion 145 of a horizontal inner tubular member 146 to facilitate swinging the horizontal member 146 into an angular downward disposition below the horizontal as indicated by broken lines in FIG. 5.

In order to facilitate the downward movement of the horizontal member 146, the articulated strut assembly 135 includes a strut arm 148 which is pivotally attached at 151 to the generally vertical tubular member 145, and a strut arm 153 which is pivotally attached at 155 to the outer end portion of the horizontal inner tubular member 146 and which is pivotally interconnected at 157 to the arm 148. In this manner, when the curved inner end portion 145 of the horizontal portion 146 moves inwardly within the vertical tubular member 144 as indicated in broken lines in FIG. 5, the pivot point 157 is pulled manually upwardly away from the horizontal member 146 to enable the horizontal tubular member 146 to move angularly downwardly away from the horizontal.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A sewer line assembly for a vehicle having a sewer outlet, comprising:
an L-shaped housing for mounting substantially flat against the vehicle;
a swivel coupler attaching one end portion of the housing to the vehicle for permitting the housing to rotate about an upright axis outwardly away from the vehicle to cause an outer end portion of the housing to extend outwardly away from the vehicle in a use position;
an expandable sewer line mounted at least partially within the housing in fluid communication with the sewer outlet for extending from the outer end portion of the housing to a remotely located sewer inlet; and
the housing and the swivel coupler including a sewer line coupler connected in fluid communication with the sewer outlet, and an annular member fixed to the housing for rotating about the sewer line coupler.

2. A sewer line assembly according to claim 1, further including a davit mechanism to help support said housing and said line from the vehicle.

3. A sewer line assembly according to claim 1, further including a valve for inhibiting the contents of the line from leaking therefrom while in the storage configuration.

4. A sewer line assembly according to claim 1, wherein said annular member is an annular flange on the housing.

5. A sewer line assembly according to claim 4, wherein said housing is generally L-shaped having a short leg and a long leg, said swivel coupler is attached to said short leg to enable it to rotate about its axis in a vertical disposition.

6. A sewer line assembly according to claim 5, wherein said swivel coupler forms a part of a davit mechanism, said mechanism including a strut extending between the short and long housing legs.

7. A sewer line assembly according to claim 6, wherein said strut is rigid.

8. A sewer line assembly according to claim 5, wherein said strut is stretchable.

9. A sewer line assembly according to claim 5, further including a hinge connection between the short and long housing legs.

10. A sewer line assembly according to claim 1, further including a housing retainer for said housing.

11. A sewer line assembly according to claim 1, wherein said housing and said coupler forming a davit mechanism for supporting said housing and said line from the vehicle, said davit mechanism including a strut.

12. A sewer line assembly according to claim 11, wherein the strut is adjustable longitudinally.

13. A sewer line assembly according to claim 12, further including a spring forming a part of said strut.

14. A sewer line assembly according to claim 11, wherein said strut is articulated.

15. A sewer line assembly according to claim 1, wherein said housing includes a pair of substantially tubular members telescoping relative to one another.

16. A sewer line assembly according to claim 1, wherein said L-shaped housing includes a curved upright portion and a horizontal portion, said portions being telescopically interconnected to enable said horizontal portion to be adjustably positioned in an angularly depending disposition.

* * * * *